United States Patent
Chen et al.

(10) Patent No.: US 6,455,219 B1
(45) Date of Patent: Sep. 24, 2002

(54) SEMICONTINUOUS EMULSION POLYMERIZATION PROCESS FOR MAKING SILICA-CONTAINING LATEX FOR TONERS

(75) Inventors: Allan K. Chen, Oakville (CA); Tie Hwee Ng, Mississauga (CA); Arthur Helbrecht, Oakville (CA); Kimberly D. Nosella, Mississauga (CA); Danielle C. Boils-Boissier, Mississauga (CA); Paul J. Gerroir, Oakville (CA); Rosa M. Duque, Brampton (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/885,957

(22) Filed: Jun. 22, 2001

(51) Int. Cl.[7] .............................. G03G 5/00; C08K 3/34
(52) U.S. Cl. ........................ 430/137.14; 430/137.15; 523/335; 524/458; 524/492; 526/81
(58) Field of Search ..................... 430/137.14, 137.15; 523/335; 524/458, 492; 526/81

(56) References Cited

U.S. PATENT DOCUMENTS

| | | |
|---|---|---|
| 4,298,672 A | 11/1981 | Lu |
| 4,338,390 A | 7/1982 | Lu |
| 5,444,140 A | 8/1995 | Paine et al. |
| 5,455,315 A | 10/1995 | Paine et al. |
| 5,945,245 A | 8/1999 | Mychajlowskij et al. |
| 5,977,210 A | 11/1999 | Patel et al. |
| 5,994,458 A | 11/1999 | Cheng et al. |
| 6,120,967 A | 9/2000 | Hopper et al. |

*Primary Examiner*—Mark Chapman
(74) *Attorney, Agent, or Firm*—Oliff & Berridge, PLC; Eugene O. Palazzo

(57) ABSTRACT

A process for making silica-containing latex particles involves polymerizing monomer in an emulsion comprising the monomer, water, silica particles, and optionally at least one surfactant, by adding at least one free radical initiator to the emulsion to form the silica-containing latex particles. In a preferred method, semicontinuous polymerization employing a seed latex is used to form the latex resin. The process achieves a silica-containing latex in which the silica is chemically incorporated therein that is ideally suited for use in the manufacture of toner and developer for xerographic use.

21 Claims, No Drawings

SEMICONTINUOUS EMULSION POLYMERIZATION PROCESS FOR MAKING SILICA-CONTAINING LATEX FOR TONERS

BACKGROUND OF THE INVENTION

1. Field of Invention

This invention relates to a novel process for incorporating silica particles into latex particles, which latex particles find particular utility in the manufacture of toner particles for use in xerographic applications.

2. Description of Related Art

Good flow properties are usually desired and often are critical for toners, and materials such as fumed silicas are known to be added to the surface of toner particles to improve flow, and may also improve charge stability of the toner and carrier mixture.

In general, it is known to include silica, also referred to as silicon dioxide, in toner particles as surface additives as discussed above. The silica imparts several advantageous properties to the toner, including, for example, toner flow, tribo enhancement, admix control, improved development and transfer stability and higher toner blocking temperature.

Most desirably, the silica improves and controls the toner flow properties of the toner. Toner cohesivity can have detrimental effects on toner handling and dispensing. Toners with excessively high cohesion can exhibit "bridging" which prevents fresh toner from being added to the developer mixing system. Conversely, toners with very low cohesion can result in difficulty in controlling toner dispense rates and toner concentration, and can result in excessive dirt in the machine. In addition, in certain applications, toner particles are first developed from a magnetic brush to donor rolls. Toner flow must be such that the electric development fields are sufficient to overcome the toner adhesion to the donor rolls and enable adequate image development to the photoreceptor. Following development to the photoreceptor, the toner particles must also be able to be transferred from the photoreceptor to the substrate.

Therefore, it is necessary to have a toner that minimizes both cohesion of particles to one another, and adhesion of particles to surfaces such as the donor rolls and the photoreceptor. Minimizing the toner cohesion and adhesion will provide high and stable development and high and uniform transfer, allowing reliable image formation.

As a method of making toner particles, a method employing the use of emulsion polymerization to form the toner resin binder is known. Emulsion polymerization comprises forming an emulsion of a surfactant and monomer in water, then polymerizing the monomer in the presence of a water soluble initiator. Emulsion polymerization is a well known industrial process. In forming toner compositions for use with reprographic or xerographic print devices, emulsion aggregation processes are known. For example, emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832, 5,405,728, 5,366,841, 5,496,676, 5,527,658, 5,585,215, 5,650,255, 5,650,256 and 5,501,935 (spherical toners).

In addition, the following U.S. patents relate to emulsion aggregation processes of forming toner compositions, the disclosures of which are incorporated herein by reference in their entireties:

U.S. Pat. No. 5,945,245 describes a surfactant free process for the preparation of toner comprising heating a mixture of an emulsion latex, a colorant, and an organic complexing agent.

U.S. Pat. No. 5,977,210 describes a process for the preparation of ink compositions comprising the emulsion polymerization of monomer, water, surfactant, and initiator with stirring and heating to provide a latex; mixing therewith a pigment dispersion of pigment particles, water, and cationic surfactant; blending the mixture; thereafter stirring the mixture; and subsequently adding additional anionic surfactant to stabilize the aggregate particles.

In such methods, one manner of incorporating the silica additive in the toner is to add the silica in the form of a pre-aggregated silica gel following the completion of the emulsion polymerization step of forming the toner binder resin. However, this method of incorporating the silica requires additional process steps in forming the pre-aggregated silica and requires additional processing time in emulsifying the silica gel into the binder. Also, it is a difficult process to scale-up in terms of viscosity, mixing, homogenization and pH control. In addition, when the toner particles having silica incorporated by such methods are heated in the aggregation and coalescing steps, a large number of coarse particles are produced, which can degrade print quality.

SUMMARY OF THE INVENTION

It is thus an object of the present invention to develop a novel method of incorporating silica into the toner to derive the beneficial properties therefrom while eliminating the above-discussed problems associated with current methods of incorporating silica.

These and other objects of the present invention are achieved by the present invention, which in embodiments relates to a process for making silica-containing latex particles, comprising polymerizing monomer in an emulsion comprising the monomer, water, silica particles, and optionally at least one surfactant, by adding at least one free radical initiator to the emulsion to form the silica-containing latex particles.

In further embodiments, the invention relates to an emulsion polymerization process for making silica-containing latex particles, comprising: forming an aqueous monomer emulsion by adding at least one monomer to an aqueous composition comprising a surfactant and silica particles in water to form a mixture, and emulsifying the mixture; charging a portion of the aqueous monomer emulsion to a reactor; adding an aqueous solution containing a free radical initiator to the reactor to produce a seed latex; and subsequently adding a remaining portion of the aqueous monomer emulsion to the reactor to obtain the silica-containing latex particles.

The silica-containing latex particles made by the present invention are ideally suited for use in toner particles, for example by adding a colorant therein and aggregating and coalescing the particles.

DETAILED DESCRIPTION OF PREFERRED EMBODIMENTS

The present invention in embodiments is directed to processes for the preparation of silica-containing latexes and which latexes can be selected for emulsion/aggregation/coalescence processes for forming toner illustrated in the patents mentioned hereinafter. Preferably, the emulsion polymerization process comprises an in situ seeded, monomer emulsion fed semicontinuous polymerization to produce the latex.

In embodiments, the present invention is directed to a process for making silica-containing latex particles, comprising polymerizing monomer in an emulsion comprising the monomer, water, silica particles, and optionally at least one surfactant, by adding at least one free radical initiator to the emulsion to form the silica-containing latex particles.

While any suitable emulsion process may be used in the present invention, most preferably a seed polymerization method is utilized. That is, the polymerization of the monomer of the emulsion is preferably conducted by first forming a seed latex from a portion of the emulsion and at least one free radical initiator, and subsequently adding a remaining portion of the emulsion, optionally with additional free radical initiator, to the seed latex. The use of a seed latex significantly reduces batch-to-batch variations in the emulsion polymerization process. Also, in situ seed formation at the beginning of a reaction is simplified since no additional reactor is needed to formulate the seed latexes.

In a preferred embodiment of the invention, the silica-containing latex particles are made by first forming an aqueous monomer emulsion by adding at least one monomer to an aqueous composition comprising a surfactant and silica particles in water to form a mixture, and then emulsifying the mixture. Next, a portion of the aqueous monomer emulsion is charged to a reactor, which most preferably already has been charged with an aqueous solution of a surfactant. Then, an aqueous solution containing a free radical initiator is charged to the reactor to produce a seed latex. Subsequent to formation of the seed latex, a remaining portion of the aqueous monomer emulsion is added to the reactor to obtain the silica-containing latex particles.

The emulsion polymerization process is most preferably conducted in a semicontinuous manner, and which may include the known starve fed method (see, for example, U.S. Pat. No. 5,444,140, incorporated by reference herein in its entirety). In particular, the remaining portion of the monomer emulsion is slowly added to the reactor over a period of time in forming the latex particles. Such semicontinuous polymerization techniques are preferred over batch emulsion polymerization techniques in the preparation of E/A (emulsion/aggregation/coalescence) toner resins as such techniques offer (1) better control of heat management during the exothermic polymerization process, especially in large-scale production; (2) more control opportunities for particle size, particle stability, molecular weight and surface properties; and (3) preservation of a more homogeneous composition for the latexes.

The aqueous monomer emulsion used to form the silica-containing latex particles comprises at least the silica particles and at least one monomer in water. Typically, at least one surfactant is also present in the aqueous monomer emulsion.

As to the silica particles, the amount of colloidal silica added to the emulsion may vary between, for example, about 0.1% to about 35% by weight, preferably about 1% to about 20% by weight, more preferably about 3% to about 5% by weight, of the total amount of monomer used in forming the latex emulsion. The colloidal silica may contain, for example, about 1% to about 40% solids, preferably from about 5% to about 25% solids. The silica particles are most preferably colloidal silica particles, i.e., silica particles having a volume average particle size, for example as measured by any suitable technique such as by using a Coulter Counter, of from about 1 nm to about 100 nm in an aqueous colloidal dispersion.

In a most preferred embodiment, the colloidal silica particles have a bimodal average particle size distribution. Specifically, the colloidal silica particles comprise first colloidal silica particles having a volume average particle size of from about 1 to about 20 nm, preferably from about 5 nm to about 10 $\mu$m, more preferably about 8 nm, and second colloidal silica particles having a volume average particle size of about 30 to about 80 nm, preferably about 35 to about 45 $\mu$m, more preferably about 40 nm. The first colloidal silica particles may comprise SNOWTEX OS supplied by Nissan Chemical Industries (~8 nm), while the second colloidal silica particles may comprise SNOWTEX OL supplied by Nissan Chemical Industries (~40 nm). The smaller sized colloidal silica particles are found to contribute to toner gloss, while the larger sized colloidal silica particles are found to contribute to toner release properties. Thus, by varying the ratio of differently sized colloidal silica particles, the toner release properties and the toner gloss may be controlled. Preferably, the first colloidal silica particles are present in an amount of from about 50% to about 90%, more preferably about 60% to about 80%, of a total amount of colloidal silica particles and the second colloidal silica particles are present in an amount of from about 10% to about 50%, more preferably about 20% to about 40%, of a total amount of colloidal silica particles.

As the aqueous solvent (water), deionized water is most preferably used.

As to the at least one monomer, any suitable monomer or mixture of monomers capable of forming a polymer through reaction with a free radical initiator or propagating free radical species may be used. Preferred monomers useful in the present invention are the acrylic and methacrylic esters, styrene, acrylonitrile, vinyl esters of aliphatic acids, ethylenically unsaturated carboxylic acids, and crosslinking (branching) agents. Suitable ethylenically unsaturated carboxylic acids may include, for example, acrylic acid, methacrylic acid, itaconic acid, maleic acid, fiumaric acid, 2-carboxyethyl acrylate and the like. Suitable branching agents for use with the monomers may include, for example, divinyl benzene, decanediol diacrylate, decanediol dimethacrylate, nonanediol diacrylate, nonanediol dimethacrylate, haxanediol diacrylate, hexanediol dimethacrylate, butadiene and the like.

Thus, examples of monomers suitable for use in the polymerization process of the present invention include but are not limited to those used for obtaining styrenelbutadiene resins, styrene/acrylate resins, styrene/methacrylate resins and vinyl resins. Suitable vinyl resins include homopolymers or copolymers of two or more vinyl monomers. Typical examples of vinyl monomeric units include but are not limited to: styrene, p-chlorostyrene, vinyl naphthalene, vinyl chloride, vinyl bromide, vinyl fluoride, ethylenically unsaturated monoolefins such as ethylene, propylene, butylene, isobutylene and the like; vinyl esters such as vinyl acetate, vinyl propionate, vinyl benzoate, vinyl butyrate, and the like; esters of alphamethylene aliphatic monocarboxylic acids such as methyl acrylate, ethyl acrylate, n-butyl acrylate, isobutyl acrylate, dodecyl acrylate, n-octyl acrylate, 2-chloroethyl acrylate, 2-carboxyethyl acylate, phenyl acrylate, methylalphachloroacrylate, methyl methacrylate, ethyl methacrylate, butyl methacrylate and the like; acrylonitrile, methacrylonitrile, acrylamide, vinyl ethers such as vinyl methyl ether, vinyl isobutyl ether, vinyl ethyl ether and the like; vinyl ketones such as vinyl methyl ketone, vinyl hexyl ketone, methyl isopropenyl ketone and the like; vinylidene halides such as vinylidene chloride, vinylidene chlorofluoride and the like; N-vinyl indole, N-vinyl pyrrolidene and the like; dienes, such as butadiene and isoprene and the like; and mixtures thereof. A water soluble monomer such as acrylic or methacrylic acid, in an amount of from about 0.01% to about 10% by weight of monomer, and preferably from about 0.1% to 3% by weight, may also be included. Small amounts of water soluble monomers may impart additional latex stability in emulsion polymerization processes.

The at least one monomer is present in an amount of from about 1% to about 98% by weight based on the total weight of polymerization reaction components used in a given particle formation or growth step of the present process. The monomer or monomers used are preferably substantially water insoluble, generally hydrophobic, and can be readily dispersed in the aqueous phase with adequate stirring when added to the reaction vessel. The dispersal of the reactive monomers can be further enhanced and assisted by in situ stabilization or oligosurfactant formation resulting from the free radical addition reaction of a water soluble initiator, such as persulfate, to the added reactive monomers. Optionally, anionic or cationic surfactant may be used to assist the dispersion process.

In a preferred embodiment, an anionic surfactant is the only surfactant used in the emulsion, and the emulsion is free of any nonionic surfactants. Preferred anionic surfactants include diphenyloxide disulfonates, such as the DOW-FAX line of anionic surfactants available from Dow Chemical, including DOWFAX 2A1 (sodium tetrapropyl diphenyloxide disulfonate), DOWFAX 3A2, DOWFAX 8390, as well as RHODACAL DSB available from Rhone-Poulenc, POLY-TERGENT 2A1, POLY-TERGENT 2EP available from Olin, AEROSOL DPOS-45 available from Cytec, CALFAX DBA-40, CALFAX 16L-35 available from Pilot Chemicals, and the like. Diphenyloxide disulfonate surfactants represent a class of highly anionic surface active agents consisting of disulfonated alkyl diphenyl oxide molecules in which the charge arises from two sulfonate groups rather than one as in the majority of surfactants (such as dodecylbenzene sulfonate) and provides excellent emulsion stability. These surfactants have a high electrolyte tolerance, high mechanical stability, and excellent stability in concentrated acids and alkalis.

The surfactant (i.e., anionic surfactant) is preferably present in the emulsion in an amount of from about 0.1% to about 10%, more preferably from about 0.6% to about 1.2%, by weight of the total amount of monomer used in forming the latex polymer. These amounts of surfactant need not all be added to the emulsion at once. For example, in one preferred embodiment, a portion of the anionic surfactant is charged with water to a reactor in which the emulsion will be formed, while remaining portions of the anionic surfactant may be used in forming the emulsion with the silica particles and at least one monomer, which emulsion is also ultimately also added to the reactor.

The emulsion may also include suitable chain transfer agents. Chain transfer agents or compounds are used to control the molecular weight and molecular weight distribution of the product resins. Examples of such chain transfer agents include, but are not limited to, alkyl thiols, including dodecanethiol, butanethiol, isooctyl-3-mercaptopropionate, 2-methyl-5-t-butyl-thiophenol, carbon tetrachloride, carbon tetrabromide, and the like. Dodecanethiol and carbon tetrabromide are most preferably used. An effective concentration of a chain transfer agent that is generally employed is, for example, from about 0.005% to about 10% by weight, and preferably from about 0.1% to about 2% by weight, of the monomers being polymerized.

The polymerization free radical initiator used in the polymerization process may be selected from various known free radical polymerization initiators. The free radical initiator can be any free radical polymerization initiator capable of initiating a free radical polymerization process, and mixtures thereof, preferably free radical initiators capable of providing free radical species upon heating to above about 30° C. The free radical initiator should be capable of producing a polymer with ionic, hydrophilic end groups at a sufficiently high concentration to produce a stable latex. The initiator concentration employed is preferably from about 0.2% to about 5% by weight of the total weight of monomer to be polymerized, and is determined by the desired molecular weight of the resin. For example, as the initiator concentration is decreased relative to the weight of molar equivalents of monomer used, the molecular weight of the resin product generally increases.

Water soluble free radical initiators or polymerization initiators employed in the process of the present invention include those that are traditionally used in emulsion polymerization reactions and that provide a water soluble or polar phase compatible functional group upon reaction with the monomers. Examples of water soluble free radical initiators are persulfates, water soluble peroxides and hydroperoxides; more specifically, sodium, potassium and ammonium persulfates, hydrogen peroxide, t-butyl hydroperoxide, cumene hydroperoxide, para-menthane hydroperoxide, and peroxy carbonates. Most preferably, the initiator is a persulfate initiator such as ammonium persulfate, potassium persulfate, sodium persulfate or mixtures thereof. Other water soluble initiators of similar decomposition mechanism may be used if desired, for example, azo compounds such as 4,4'-azobis(4-cyanovaleric acid); 1,1'-azobis(1-methylbutyronitrile-3-sodium sulfonate); 2,2'-azobis(2-amidinopropane)dihydrochloride; 2,2'-azobis (2-amidinopropane)dihydrochloride; 2,2'-azobis(2-amidinopropane)dihydrochloride; 2,2'-azobisisobutyl amide dihydrate; 2,2'-azobis{2-(2-imidazolin-2-yl)propane}dihydrochloride; and 2,2'-azobis {2-(5-methyl-2-imidazolin-2-ylpropane}dihydrochloride.

A preferred process for making the silica-containing latex will now be detailed.

First, an aqueous monomer emulsion is made to be comprised of at least one of the aforementioned monomers, water, and the silica particles, along with optional ingredients such as the surfactant, which is preferably only an anionic surfactant as discussed above, chain transfer agents, etc. The aqueous mixture is first preferably made by adding the monomer(s) to an aqueous portion containing the surfactant, silica particles and water. Thereafter, the mixture is emulsified to form the aqueous monomer emulsion to be used in making the latex. Emulsification may be done by any suitable process, for example high speed mixing at low temperature. For example, the mixture may be mixed in a homogenizer set at about 5,000 to about 25,000 rpm and at a temperature of from about 5° C. to about 50° C. for a sufficient period of time, which is typically from about 30 seconds to about 10 minutes.

A small portion of the monomer emulsion is then preferably added to a reactor as a seed for the latex. For example, from about 1% to about 50% by weight of the monomer emulsion may be initially charged to the reactor as seed. In addition, the reactor may have already been charged with a portion of the surfactant in water prior to addition of the initial seed portion of the monomer emulsion. For example, the reactor may already include from about 1% to about 50% of the total amount of surfactant to be included in making the latex.

Any type of reactor may be suitably used without restriction. The reactor should include means for stirring the compositions therein. Preferably, the reactor includes at least one impeller. For forming the latex in the present invention, the reactor is preferably operated throughout the process such that the impellers operate at an effective mixing rate of about 10 to about 1,000 rpm. For example, an effective mixing rate for a 5,000 gallon reactor may be about 35 rpm whereas an effective mixing rate for a 2 Liter size reactor may be about 500 rpm.

Seed polymerization is thereafter initiated by addition of the free radical initiator. The reaction of the free radical initiator and monomer produces the seed latex comprised of seed latex resin, which seed latex is stabilized by the surfactant. The amount of the free radical initiator added may be from about 30% to 100% by weight, preferably from about 50% to 100% by weight, and most preferably 100% by weight of the total amount of free radical initiator used to prepare the latex resin. Prior to addition, the temperature of the materials in the reactor is brought to about 20° C. to about 200° C., preferably about 50° C. to about 150° C., which temperature is maintained during addition of the free radical initiator.

After formation of the stable seed latex, the remainder of the monomer emulsion, optionally along with any remaining free radical initiator to be added, is added to the reactor to complete the reaction and to obtain the silica-containing latex. Preferably, the addition of the remaining portion of the monomer emulsion is done semicontinuously over a period of time. For example, the remaining portion of the monomer emulsion may be added to the reactor at a rate of about 0.1 gram per kilogram of reactor content per minute to about 50 grams per kilogram of reactor content per minute, preferably to about 10 grams per kilogram of reactor content per minute. As examples, the pumping feed rate for the remaining portion may be, for example, from about 3.66 kg/min in a 300 gallon size reactor to about 61.0 kg/min to a 5,000 gallon reactor, the remaining portion all being charged within about 90 minutes. Starve fed conditions may be used if desired, which occur when the monomer in the reaction is consumed by polymerization at about the same rate as it is added. The temperature and stirring conditions discussed above for formation of the seed latex are preferably maintained during formation of the subsequent latex resin.

If desired, the chain transfer agents may be separately or additionally added during the addition phase of the remaining portion of the emulsion monomer.

Following completion of the monomer addition, the latex may be permitted to stabilize by maintaining the conditions for a period of time, for example for about 10 to about 300 minutes, before cooling. Thereafter, the latex resin may be deoxygenated, if desired.

The latex obtained by the foregoing method is a silica-bonded-latex in which the silica is chemically incorporated into the latex particles. The latex resins preferably have a weight average molecular weight of from about 2,000 to about 200,000, and preferably from about 5,000 to about 70,000, a number average molecular weight of from about 1,000 to about 100,000, and preferably from about 1,500 to about 40,000, and a glass transition temperature (Tg) of from about 20° C. to about 100° C., and preferably from about 40° C. to about 60° C. The latex particles preferably have a size of from about 150 nm to about 300 nm, preferably from about 180 nm to about 250 nm.

The silica-containing latex resins prepared by the foregoing methods perform at least as well as prior latex resins in which the silica is incorporated via a pre-aggregated gel after formation of the latex, but is simpler to manufacture. Moreover, the latex leads to toners having fewer coarse particles compared to the prior latexes, and thus achieves toners having better overall size distributions, for example a volume average geometric size distribution (GSD) of less than about 1.25. It has also been surprisingly found that chemically incorporating the silica into the latex as in the present invention can surprisingly improve the stripping performance of the toner in use.

Stripping force is that amount of force necessary to remove an image receiving substrate, typically paper, from a fuser roll and pressure roll. In xerography, when toners are fused to paper after an imaging process, the next step is releasing the paper from the fuser roll and pressure roll. The toner must have a property to allow the fused images on the paper to be released without problems, i.e., the stripping force must be less than the self-releasing force. If it is not, a paper jam on the photocopier is likely to occur. Of course, the stripping force parameters depends on the process speed of how many copies per minute and also is a function of process temperatures, and thus varies from device to device. It has been found, however, that by making the toner from latex particles of the present invention having silica incorporated therein, the stripping force of the toner can be surprisingly reduced compared to toners made from latex particles without silica. For example, in a device designed for a maximum stripping force of 45 gf, a toner prepared from a latex without silica exhibited a maximum stripping force of 32.8 gf, while toners from a latex prepared in accordance with the present invention and containing 5% total silica exhibited a maximum stripping force of 23.3 gf.

The latex resin formed by the above process may be isolated by standard methods known in the art. For example, further processing of the resin may include, but is not limited to, coagulation, dissolution and precipitation, filtration, washing, drying, or the like. Toners of the invention are most preferably formed by the known aggregation/coalescence technique such as detailed in the patents discussed in the background section above.

The latex resins of the invention may be incorporated into toners, inks and developers by known methods. For example, the resins are generally present in a toner in an amount of from about 40% to about 98% by weight, and more preferably from about 70% to about 98% by weight, although they may be present in greater or lesser amounts. For example, toner resins of the invention can be subsequently melt blended or otherwise mixed with a colorant, charge control additives, surfactants, emulsifiers, pigment dispersants, flow additives, and the like. The resultant product can then be pulverized by known methods such as milling to form toner particles. The toner particles preferably have an average volume particle diameter of about 2 microns to about 25 microns, more preferably about 3 microns to about 15 microns.

Any suitable colorants (pigment or dye) may be employed in toners of the invention, including suitable colored pigments, dyes, and mixtures thereof including Carbon Black, such as REGAL 330 CARBON BLACK (Cabot), Acetylene Black, Lamp Black, Aniline Black, CHROME YELLOW, Zinc Yellow, SICOFAST YELLOW, LUNA YELLOW, NOVAPERM YELLOW, CHROME ORANGE, BAYPLAST ORANGE, Cadmium Red, LITHOL SCARLET, HOSTAPERM RED, FANAL PINK, HOSTAPERM PINK, LITHOL RED, RHODAMINE LAKE B, BRILLIANT CARMINE, HELIOGEN BLUE, HOSTAPERM BLUE, NEOPAN BLUE, PV FAST BLUE, CINQUASSI GREEN, HOSTAPERM GREEN, titanium dioxide, cobalt, nickel, iron powder, SICOPUR 4068 FF, and iron oxides such as MAPICO BLACK (Columbia), NP608 and NP604 (Northern Pigment), BAYFERROX 8610 (Bayer), MO8699 (Mobay), TMB-100 (Magnox), mixtures thereof and the like.

The colorant, preferably black, cyan, magenta and/or yellow colorant, is incorporated in an amount sufficient to impart the desired color to the toner. In general, pigment or dye is employed in an amount ranging from about 2% to about 60% by weight, and preferably from about 2% to about 15% by weight for color toner and about 5% to about 60% by weight for black toner.

Various known suitable effective positive or negative charge enhancing additives can be selected for incorporation into a toner composition of the present invention, preferably in an amount of about 0.1% to about 10% by weight, and more preferably about 1% to about 3% by weight. Examples include quaternary ammonium compounds inclusive of alkyl pyridinium halides; alkyl pyridinium compounds, reference U.S. Pat. No. 4,298,672, the disclosure of which is totally incorporated herein by reference; organic sulfate and sulfonate compositions, U.S. Pat. No. 4,338,390, the disclosure of which is totally incorporated herein by reference; cetyl pyridinium tetrafluoroborates; distearyl dimethyl ammonium methyl sulfate; aluminum salts such as BONTRON E84 or E88 (Hodogaya Chemical); and the like. Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like. The carrier particles can be mixed with the toner particles in various suitable combinations. However, best results are obtained when about 1 part carrier to about 10 parts to about 200 parts by weight of toner are mixed.

Toners of the invention can be used in known electrostatographic imaging methods. Thus for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll.

The following examples further illustrate specific embodiments of this invention.

EXAMPLE 1

The formulation comprises styrene/n-butyl acrylate/2-carboxyethyl acrylate copolymer of 77.5:22.5:3 composition using 1.71 pph dodecanethiol (chain transfer agent), 0.35 pph branching agent (decanediol diacrylate) and 1.5% of ammonium persulfate initiator. It is synthesized by a semi-continuous emulsion polymerization process.

In a 2 L jacketed stainless steel reactor with double flight impellers (a four pitched-blade impeller each) set at 350 rpm, 514 grams of deionized water with 1.72 grams of DOWFAX 2A1 (5% of the total surfactant) are charged while the temperature is raised to 75° C. A monomer emulsion is prepared by mixing a monomer mixture (418.5 grams of styrene, 121.5 grams of n-butyl acrylate, 16.2 grams of 2-carboxyethyl acrylate (β-CEA), 1.89 grams of decanediol diacrylate and 5.94 grams of 1-dodecanethiol), 280 grams of colloidal silica with 33.0 grams of deionized water plus 9.77 grams of DOWFAX 2A1 (95% of the total surfactant) at room temperature for 30 minutes. This is done by mixing at high speed in a 2-litre container.

An 8.8 gram of seed is taken from the monomer emulsion and pumped into the 2 L reactor at 75° C. An initiator solution prepared from 8.1 grams of ammonium persulfate in 45 grams of deionized water is added over 20 minutes after the seed emulsion addition. Stirring is continued for an additional 20 minutes to allow seed particle formation at 75° C. Half of the remaining monomer emulsion is then fed into the reactor over 90 minutes. Monomer emulsion feeding is then stopped, at which time 3.294 grams of 1-dodecanethiol is added to the remaining emulsion in the 2 L container and mixed for 5 minutes before feeding is resumed for 90 minutes. At the end of the monomer feed, the emulsion is post-heated at 75° C. for 180 minutes, then cooled. The reaction system is deoxygenated by passing a stream of nitrogen through it during the reaction.

A latex containing 43.5 percent solids with a particle size of 187 nm is obtained. The silica-latex has an Mw of 31,600, an Mn of 11,600 and an onset Tg of 50.9° C.

Toner complex viscosity is a key analytical data evaluated for evidence of silica incorporation in E/A toner. The higher the complex viscosity, the better the silica incorporation and subsequently the better the toner performance in terms of toner gloss and toner release. Ideally, the toner complex viscosity falls within about 4,000 Poise to 5,000 Poise for best performance. The foregoing latex resin, when formed into a toner via aggregation and coalescence with a colorant, exhibits a toner complex viscosity of about 4,500 Poise.

EXAMPLE 2

The formulation comprises styrene/n-butyl acrylate/2-carboxyethyl acrylate copolymer of 77.5:22.5:3 composition using 1.71 pph dodecanethiol (chain transfer agent), 0.35 pph branching agent (decanediol diacrylate) and 1.5% of ammonium persulfate initiator. It is synthesized by a semi-continuous emulsion polymerization process.

In a 2 L jacketed stainless steel reactor with double flight impellers (a four pitched-blade impeller each) set at 250 rpm, 514 grams of deionized water with 1.72 grams of DOWFAX 2A1 (5% of the total surfactant) are charged while the temperature is raised to 75° C. A monomer emulsion is prepared by mixing a monomer mixture (418.5 grams of styrene, 121.5 grams of n-butyl acrylate, 16.2 grams of 2-carboxyethyl acrylate (β-CEA), 1.89 grams of decanediol diacrylate and 5.94 grams of 1-dodecanethiol), 280 grams of colloidal silica with 33.0 grams of deionized water plus 9.77 grams of DOWFAX 2A1 (95% of the total surfactant) at room temperature for 30 minutes. This is done by mixing at high speed in a 2-litre container.

An 8.8 gram of seed is taken from the monomer emulsion and pumped into the 2 L reactor at 75° C. An initiator solution prepared from 8.1 grams of ammonium persulfate in 45 grams of deionized water is added over 20 minutes after the seed emulsion addition. Stirring is continued for an additional 20 minutes to allow seed particle formation at 75° C. Half of the remaining monomer emulsion is then fed into the reactor over 90 minutes. Monomer emulsion feeding is then stopped, at which time 3.294 grams of 1-dodecanethiol is added to the remaining emulsion in the 2 L container and mixed for 5 minutes before feeding is resumed for 90 minutes. The mixing in the reactor is raised to 400 rpm at this stage. At the end of the monomer feed, the emulsion is post-heated at 75° C. for 180 minutes, then cooled. The reaction system is deoxygenated by passing a stream of nitrogen through it during the reaction.

A latex containing 37.8 percent solids with a particle size of 228 nm is obtained. The silica-latex has an Mw of 36,771, an Mn of 11,270 and an onset Tg of 51.3° C.

What is claimed is:

1. A process for making silica-containing latex particles, comprising polymerizing monomer in an emulsion comprising the monomer, water, silica particles, and optionally at least one surfactant, by adding at least one free radical initiator to the emulsion to form the silica-containing latex particles.

2. The process according to claim 1, wherein the emulsion contains at least one surfactant.

3. The process according to claim 2, wherein the at least one surfactant is an anionic surfactant.

4. The process according to claim 1, wherein the emulsion is free of any nonionic surfactant.

5. The process according to claim 1, wherein the silica particles are colloidal silica particles.

6. The process according to claim 5, wherein the colloidal silica particles comprise first colloidal silica particles having an average particle size of from about 1 to about 20 nm and second colloidal silica particles having an average particle size of about 30 to about 80 nm.

7. The process according to claim 6, wherein the first colloidal silica particles are present in an amount of from about 50% to about 90% of a total amount of colloidal silica particles and the second colloidal silica particles are present in an amount of from about 10% to about 50% of a total amount of colloidal silica particles.

8. The process according to claim 1, wherein the polymerizing is conducted by first forming a seed latex from a portion of the emulsion and at least one free radical initiator, and subsequently adding a remaining portion of the emulsion, optionally with additional free radical initiator, to the seed latex.

9. An emulsion polymerization process for making silica-containing latex particles, comprising:
   forming an aqueous monomer emulsion by adding at least one monomer to an aqueous composition comprising an optional surfactant and silica particles in water to form a mixture, and emulsifying the mixture;
   charging a portion of the aqueous monomer emulsion to a reactor;
   adding an aqueous solution containing a free radical initiator to the reactor to produce a seed latex; and
   subsequently adding a remaining portion of the aqueous monomer emulsion to the reactor to obtain the silica-containing latex particles.

10. The emulsion polymerization process according to claim 9, wherein the aqueous monomer emulsion includes a surfactant and wherein prior to charging a portion of the aqueous monomer emulsion to the reactor, the reactor is charged with a portion of the surfactant and water.

11. The emulsion polymerization process according to claim 9, wherein the process is semi-continuous in that the remaining portion of the aqueous monomer emulsion is added to the reactor over a period of time.

12. The emulsion polymerization process according to claim 9, wherein at least one surfactant that is an anionic surfactant is present.

13. The emulsion polymerization process according to claim 9, wherein the emulsion is free of any nonionic surfactant.

14. The emulsion polymerization process according to claim 9, wherein the silica particles are colloidal silica particles.

15. The emulsion polymerization process according to claim 14, wherein the colloidal silica particles comprise first colloidal silica particles having an average particle size of from about 1 to about 20 nm and second colloidal silica particles having an average particle size of about 30 to about 80 nm.

16. The emulsion polymerization process according to claim 15, wherein the first colloidal silica particles are present in an amount of from about 50% to about 90% of a total amount of colloidal silica particles and the second colloidal silica particles are present in an amount of from about 10% to about 50% of a total amount of colloidal silica particles.

17. The emulsion polymerization process according to claim 9, wherein a chain transfer agent is added during the subsequent addition of the remaining portion of the aqueous monomer emulsion.

18. The emulsion polymerization process according to claim 9, wherein additional free radical initiator is added during the subsequent addition of the remaining portion of the aqueous monomer emulsion.

19. The emulsion polymerization process according to claim 9, wherein the at least one monomer is selected from the group consisting of acrylic and methacrylic esters, styrene, acrylonitrile, vinyl esters of aliphatic acids, and ethylenically unsaturated carboxylic acids.

20. The emulsion polymerization process according to claim 9, wherein the free radical initiator is selected from the group consisting of persulfates, peroxides and hydroperoxides.

21. The emulsion polymerization process according to claim 9, wherein the silica-containing latex particles are further prepared into toner particles through inclusion of a colorant therein and aggregation and coalescing of the particles.

* * * * *